UNITED STATES PATENT OFFICE.

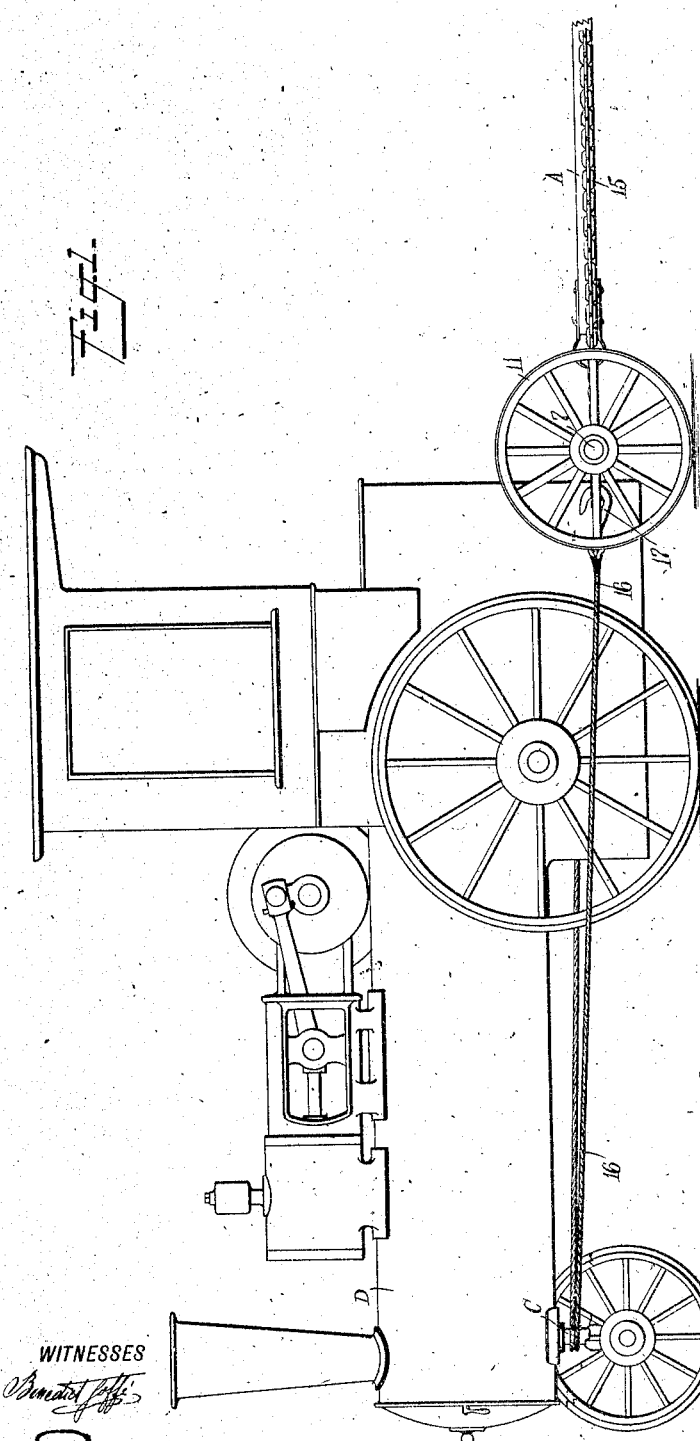

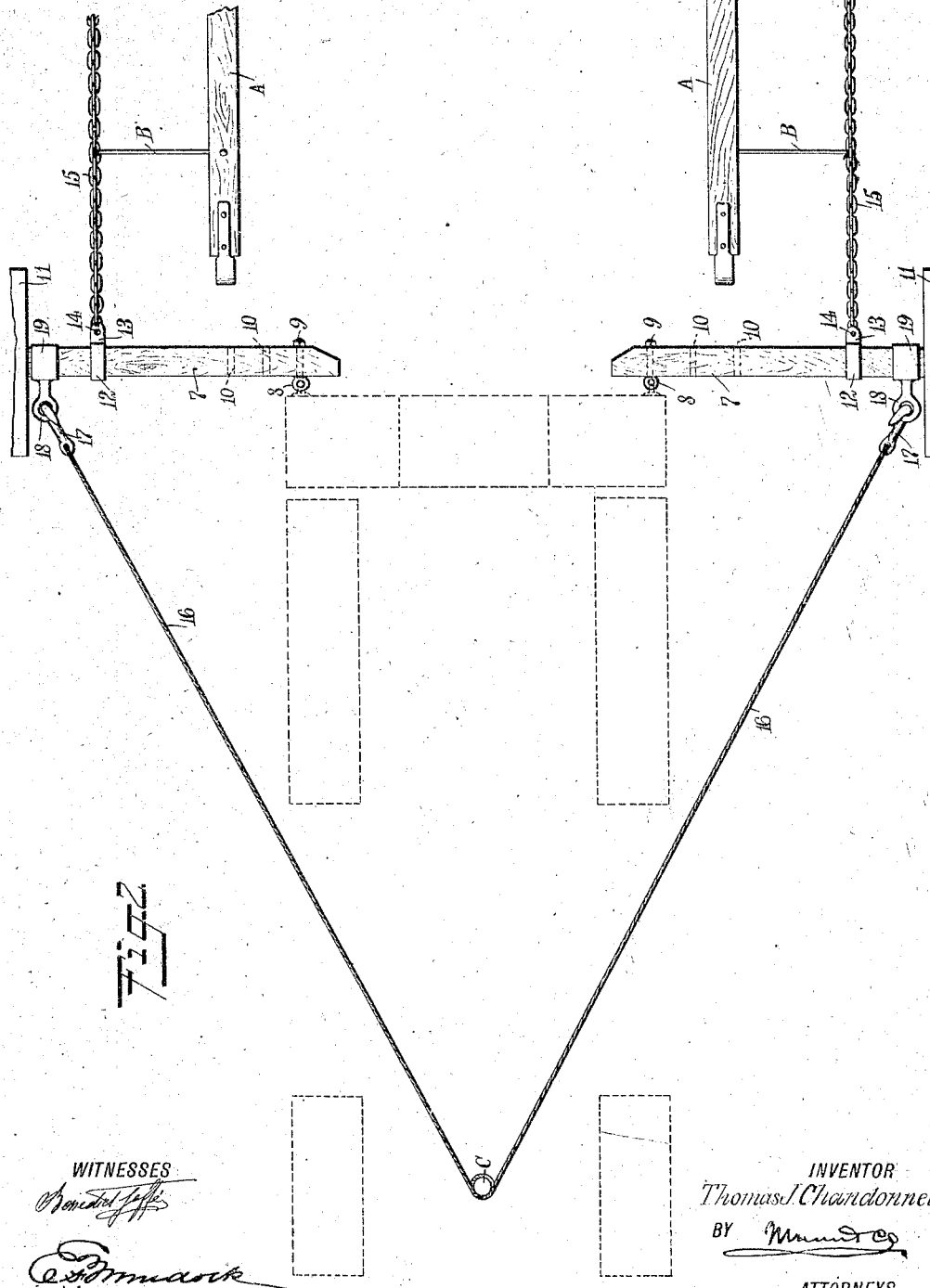

THOMAS J. CHANDONNET, OF WAUBUN, MINNESOTA.

SPREADER-BARS FOR TRACTION-ENGINE HITCH.

990,031.

Specification of Letters Patent. Patented Apr. 18, 1911.

Application filed November 11, 1910. Serial No. 591,821.

*To all whom it may concern:*

Be it known that I, THOMAS J. CHANDONNET, a citizen of the United States, and a resident of Waubun, in the county of Mahnomen and State of Minnesota, have invented new and Improved Spreader-Bars for Traction-Engine Hitch, of which the following is a full, clear, and exact description.

The principal object which the present invention has in view is: to provide means for connecting the hitching cables of grading machines to a traction engine, whereby the machine may be maintained in operative position at opposite sides of the road while the traction engine travels in the center of the road, and whereby the laterally extended ends of the spreader bars are supported in spaced relation to the surface of the ground.

One embodiment of the present invention is disclosed in the structure illustrated in the accompanying drawings, in which like characters of reference denote corresponding parts in both views, and in which—

Figure 1 is a side elevation of a traction engine of approved construction, having attached thereto a hitching device constructed and arranged in accordance with the present invention; and Fig. 2 is a plan view of the spreader bars of the extension hitch, constructed and arranged in accordance with the present invention, the dotted lines in said figure illustrating the wheels of the traction engine and the water tank thereof, and the fragments of cable and end of guide tongues illustrating the relative position of the said spreader bars to the graders and connecting cables thereof.

In the accompanying drawings there is shown a traction engine of an approved type. To the rear of the engine and at the sides thereof, in any convenient position, are secured extension beams 7, 7. The beams 7, 7 are secured to the engine by means of eyelets 8, 8 formed at the ends of bolts 9, 9. To receive the bolts 9, 9 the beams 7, 7 are provided with a series of perforations 10, 10 through which the bolts 9 may be threaded, the said perforations being arranged to permit the adjustment of the beams 7, 7 to be laterally contracted and expanded.

The outer ends of the beams 7, 7 are supported on wheels 11, 11. The wheels 11, 11 are adapted in size to hold the beams 7, 7 in substantially horizontal position to the road or earth over which the traction engine is moved. Slidably mounted on the beams 7, 7 are collars 12, 12. The collars 12, 12 are provided with ear tabs 13, 13, horizontally extended to the rear and perforated to receive bolts 14, 14, which bolts 14, 14 are extended through any convenient one of the links forming the draft cables 15, 15. The draft cables 15, 15 are suitably connected to the scrapers or other implements being dragged by the traction engine.

The implements connected with the cables 15, in the usual employ of the engine and hitch shown in the accompanying drawings, are road graders of the elevator or push types. The tongues A, A connected therewith are shown in the drawings as being held in parallel disposition to the cables 15 by means of fender bars B, B. If the tongues are otherwise unsupported they may be flexibly connected with the engine or with the spreader beams 7.

To maintain the horizontally extended position of the beams 7, 7 there is provided a cable 16, the ends whereof are provided with grab hooks 17, 17, which are carried by eyelets 18, 18. The eyelets 18, 18 are extended from the sides of thimbles 19, 19 fixedly connected on the beams 7, 7. The cable 16, as shown in the drawings, and best in Fig. 2 thereof, is twisted to a bight about the pivot post C of the tractor D. Any suitable provision may be made for anchoring the cable 16 or ends thereof to the forward end of the frame of the tractor.

Having thus described my invention, what I claim as new and desire to secure by Letters Patent is:—

1. Spreader bars for traction engine hitch, each comprising a beam provided with a series of longitudinally spaced perforations; a bolt adapted to fit said perforations and pivotally connected with the rear end of a tractor and at the side thereof; a supporting wheel pivotally mounted upon and in supporting relation to the outer end of said beam; a cable securing device mounted on said beam intermediate the said tractor and supporting wheel therefor; and means for connecting the forward end of the frame of said tractor and the outer end of said beam.

2. Spreader bars for traction engine hitch, each comprising a beam provided with a series of longitudinally spaced perforations; a supporting wheel pivotally mounted upon and in supporting relation to the outer end of said beam; a cable securing device slidably mounted on said beam adjustable longitudinally thereon; and means for connecting the forward end of the frame of a tractor and the outer end of said beam.

3. Spreader bars for traction engine hitch, comprising a plurality of extension beams pivotally connected with and at both sides of a tractor; a plurality of supporting wheels pivotally mounted upon and in supporting relation to the outer ends of said beams; a plurality of cable securing devices mounted on said beams intermediate the said tractor and supporting wheels therefor; and a plurality of means for connecting the forward end of the frame of said tractor and the outer ends of said beams.

4. Spreader bars for traction engine hitch, comprising a plurality of beams each provided with a series of longitudinally spaced perforations; a plurality of bolts adapted to fit said perforations, each of said bolts being pivotally connected at the rear end of a tractor and at both sides thereof; a plurality of supporting wheels pivotally mounted upon and in supporting relation to th outer ends of said beams; a plurality o cable securing devices mounted on said beams intermediate the said tractor and supporting wheels therefor; and a plurality of means connecting the forward end of the frame of said tractor and the outer ends of said beams.

In testimony whereof I have signed my name to this specification in the presence of two subscribing witnesses.

THOMAS J. CHANDONNET.

Witnesses:
H. A. KROSTUE,
THOS. BEMENT.